Patented Sept. 28, 1937

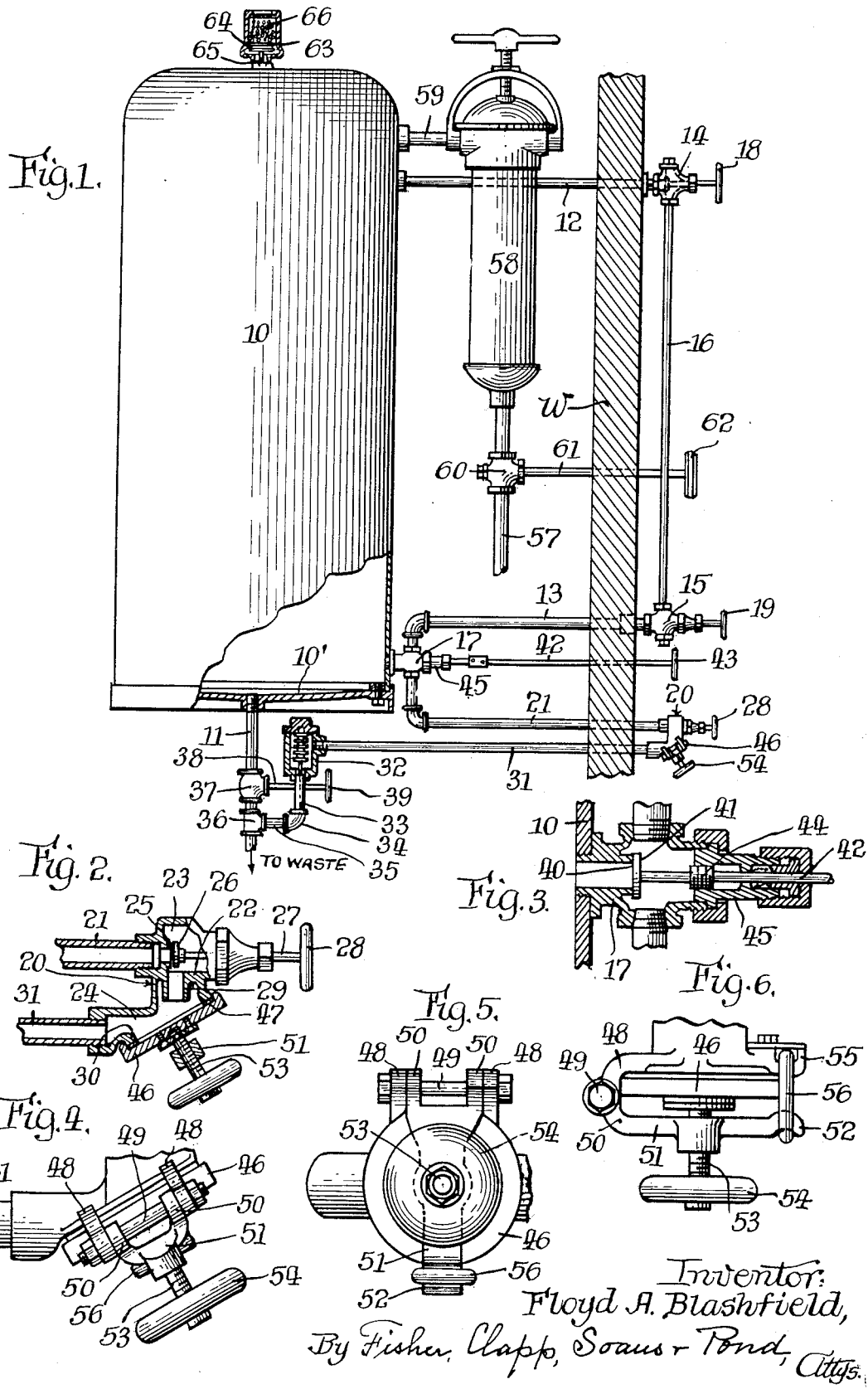

2,094,056

UNITED STATES PATENT OFFICE 2,094,056

STERILIZING TANK

Floyd A. Blashfield, Madison, Wis., assignor to Scanlan-Morris Company, Madison, Wis., a corporation of Wisconsin Application April 4, 1935, Serial No. 14,582

15 Claims. (Cl. 21—104)

This invention relates to the art of liquid sterilizing apparatus. Apparatus of this character, extensively used in hospitals and bacteriological laboratories, commonly includes a tank to hold the liquid to be sterilized by heat, means—usually a steam coil—for heating the liquid to a sterilizing temperature, a glass gauge mounted on one side of the tank to indicate to the operator the level of the liquid in the tank, and a draw-off line terminating in a faucet for drawing off the sterilized liquid.

The water in the gauge glass and draw-off line, not being subjected to the full sterilizing heat existing in the tank itself, may not be sterilized; and if this water is allowed to mingle with the sterilized water in the tank as the latter is emptied, the entire body of water may be contaminated. Furthermore, the discharge end of the draw-off faucet below the faucet valve is exposed to the air of the room which may be more or less laden with dust carrying bacteria, and hence the sterile liquid as it is drawn off from the tank may become contaminated by bacteria as it flows through the faucet.

The general object or aim of the present invention is to render apparatus of this character more perfectly immune against possible contamination of the sterilized liquid as the latter is drawn off for use, and a more specific object is to provide means whereby the gauge glass and the draw-off line and its faucet shall be rendered perfectly sterile prior to the withdrawal of the sterilized liquid from the tank.

One means by which the above stated objects may be attained in accordance with the principle of the present invention is illustrated in the accompanying drawing, in which:—

Fig. 1 is a side elevation, partly in vertical section, of the complete apparatus, the view showing a recessed-in-wall installation.

Fig. 2 is an enlarged view, mainly in vertical section, of the draw-off faucet and associated pipes.

Fig. 3 is an enlarged view, in vertical section, of a fitting on the tank that is associated with both the gauge and the draw-off line.

Figs. 4, 5 and 6 are detail views of an openable closure that normally seals the discharge spout of the draw-off faucet; Fig. 4 being a side elevation; Fig. 5 a bottom plan; and Fig. 6 a front elevation.

Referring to the drawing, 10 designates a tank adapted to contain a body of water or other liquid to be sterilized, the liquid being heated by any suitable means such, for instance, as a steam coil (not shown). From the center of the concave bottom wall 10' of the tank 10 a valve controlled drain pipe 11 leads to waste.

From one side of the tank 10 upper and lower pipes 12 and 13 lead through a wall W to upper and lower hollow fittings 14 and 15 respectively, in and between which fittings is mounted the usual gauge glass 16.

The pipes 12 and 13 serve to place the gauge glass in communication with the tank, and the inner end of pipe 13 communicates with one side of a fitting 17 that, as best shown in Fig. 3, is secured to and communicates with the lower portion of the tank. The upper and lower fittings 14 and 15 are equipped with the usual valves 18 and 19 for opening and closing the communications of the upper and lower ends of the gauge glass with the tank.

The draw-off faucet is designated as an entirety by 20, and its preferred internal structure is best illustrated in Fig. 2. The upper portion of the faucet housing communicates with the fitting 17 through a pipe 21. The faucet housing has a transverse partition 22 forming an upper valve chamber 23 and a lower steam flow chamber 24. In the upper chamber 23 is a valve seat 25 controlled by a draw-off faucet valve 26, said valve being equipped with a stem 27 and a hand wheel 28. On the lower side of the partition 22 is the faucet nozzle 29 through which the sterilized water from the tank flows and through which, when the water from the tank is cut off by the valve 41, steam also flows from the upper chamber 23 into the steam flow chamber 24, when the valve 26 is open, said chamber 24 forming an enclosure for the faucet nozzle 29. The lower inclined side of that portion of the faucet housing forming the steam flow chamber 24 has an opening taking the form of a short discharge end or spout 30, through which water discharged from the nozzle 29 flows across the chamber 24; and from the chamber 24 a pipe 31 leads to the waste line 11, through a steam trap 32, a pipe 33, an elbow 34, a pipe 35, and a T-fitting 36 interposed in the waste line 11. In the waste line 11 above the T-fitting 36 is a drain valve 37 operated by a valve stem 38 and a hand wheel 39.

The fitting 17 is formed with a valve seat 40 (Fig. 3) that cooperates with a tank shut-off valve 41 having a stem 42 that extends through the wall W and is equipped on its outer end with a hand wheel 43. The valve stem 42 has a threaded portion 44 engaged with a threaded hole in a cap member and valve stem guide 45 that closes the outer end of fitting 17, so that, by turning the hand wheel 43, the valve 41 is opened or closed.

The discharge end or spout 30 of the faucet housing is equipped with a closure member, herein shown as a flat plate 46 equipped with a washer 47 and adapted to effectively seal said discharge spout by the following means.

On one side of the faucet housing are a pair of hinge lugs 48 that support a hinge pintle 49, pivoted on which pintle are a pair of hinge lugs 50 constituting an integral end portion of a locking bar 51 that extends beneath and across the cover plate 46 and is formed on its free end with a hook 52. In a tapped hole in the center of bar 51 is a screw 53, the inner end of which has a swiveled connection to the cover plate 46, and the outer end of which is equipped with a hand wheel 54. Suspended on a hook-shaped lug 55 on the faucet housing is a releasable catch in the form of a loop 56, the lower end of which cooperates with the hook 52 of the locking bar 51 in an obvious manner.

The water supply to the tank 10 comprises a supply pipe 57 connecting with the lower end of an ordinary water filter 58, the upper end of which latter communicates by a pipe 59 with the interior of the tank 10. The water is turned on and off by a valve 60 equipped with a stem 61 extending through the wall W and supplied with a hand wheel 62.

On the top of the tank 10 I have illustrated an air intake of a well known type comprising a casing 63 having a threaded stem entering the top wall of the tank, a heat expansible diaphragm 64 in said casing carrying a valve 65, and a body of air filtering material 66 in the upper portion of the casing 63.

In operating the sterilizer, the operator first fills the tank 10 with water by opening the valve 60, valves 19 and 41 being open and valve 26 closed. He then closes the hinged closure or cover member 46 over the discharge spout 30 by swinging it into registering position, applying the catch 56, and then turning up the screw 53 so that the cover 46 fits the spout water and steam tight. He then closes the tank shut-off valve 41 in the fitting 17 and opens the draw-off faucet valve 26. When this is done all the water above the draw-off faucet in the gauge glass 16, fitting 15, pipe 13, fitting 17 and pipe 21 is discharged through the faucet housing 20 and out through the waste line 31 and the connections of the latter to the main waste line 11.

When the water in the sterilizer starts to boil, the steam closes the air inflow valve 65 and flows out through pipe 12, through the upper gauge fitting 14, down through the gauge glass 16, through the lower gauge fitting 15, through pipe 13, fitting 17 and pipe 21, through the draw-off faucet 20, waste pipe 31, steam trap 32, and thence to the main waste line 11. The steam trap 32 causes an intermittent flow of steam through the parts last described, during the entire sterilizing period, the steam condensate collecting in the trap 32 and flowing to the waste as the steam trap valve intermittently opens and closes. By this flow of steam the parts through which the steam flows are all sterilized at the same pressure and time as is being used in the sterilizing tank 10. At the end of the sterilizing period the draw-off faucet valve 26 is closed, and the tank shut-off valve 41 is opened, which permits the draw-off line and gauge glass to be filled with sterile water from the tank.

When the operator is ready to use the water, the hinged cover 46 of the faucet is retracted and swung back, and the water is discharged by opening the draw-off valve 26. Thus the water being discharged comes in contact with nothing but thoroughly sterilized surfaces. When the sterilizer is not in use, the cover 46 can be slipped back over the discharge spout 30 of the faucet and screwed down, thus protecting the internal surface of the faucet from dust or other accidental contamination.

From the foregoing it will be apparent that by the use of this invention no unsterile water is allowed to commingle with the sterilized water, nor does the latter in its outflow come into contact with any unsterilized surfaces.

While I have shown and described one practical and approved embodiment of the principle of the invention which in practice has been found to satisfactorily effectuate the stated purposes and objects of the invention, it is manifest that the structural details might be widely varied without departing from the operative principle or sacrificing any of the advantages of the invention. Hence I do not limit the invention to such structural details, except to the extent clearly indicated in specific claims.

I claim:

1. The combination with a sterilizing tank, and a draw-off faucet for said tank, of means for subjecting the entire internal surface of said faucet to steam from said tank during the sterilizing operation, substantially as set forth.

2. The combination with a sterilizing tank, a gauge glass, and upper and lower hollow fittings supporting said gauge glass and communicating with said tank, of a draw-off faucet for said tank communicating with said lower fitting, and means for subjecting the entire internal surface of said faucet to a flow of steam from said tank through said gauge glass and fittings during the sterilizing operation, substantially as set forth.

3. A faucet for sterilizing tanks and the like, comprising a one-piece housing containing an upper chamber, a lower chamber, a draw-off valve in said upper chamber, a flow passage from said upper chamber to said lower chamber, and an opening in the wall of said lower chamber beneath said flow passage, and an openable closure member sealing said opening.

4. A faucet for sterilizing tanks and the like, comprising a one-piece housing containing an upper chamber, a lower chamber, a draw-off valve in said upper chamber, a discharge nozzle depending from the bottom wall of said upper chamber into said lower chamber, and an opening in the wall of said lower chamber beneath said nozzle, and an openable closure member sealing said opening.

5. A faucet for sterilizing tanks and the like, comprising a one-piece housing containing an upper chamber, a lower chamber, a draw-off valve in said upper chamber, a discharge nozzle depending from the bottom wall of said upper chamber into said lower chamber, and an opening in the wall of said lower chamber beneath said nozzle, a cover plate for said opening, and means hinged on said housing for supporting said cover plate and clamping the same in sealing engagement with said opening.

6. A faucet for sterilizing tanks and the like, comprising a housing containing an upper chamber, a lower chamber, a draw-off valve in said upper chamber, a discharge nozzle depending from the bottom wall of said upper chamber into said lower chamber, and an opening in the wall of said lower chamber beneath said nozzle, a cover plate for said opening, a bar hinged at one end to said housing and extending beneath and across said cover plate, a releasable catch supporting the other end of said bar and a screw mounted in said bar engaged with said cover plate for forcing the latter into sealing engagement with said discharge opening.

7. The combination with a sterilizing tank, of a faucet for said tank comprising a one-piece housing having an upper chamber, a lower chamber, a draw-off valve in said upper chamber, a flow passage from said upper chamber to said lower chamber, and an opening in the wall of said lower chamber beneath said flow passage, an openable closure member sealing said opening, and means for conducting a flow of steam from said tank through both of said chambers.

8. The combination with a sterilizing tank, of a one-piece valved faucet for said tank having a steam flow chamber underlying and communicating with the nozzle of said faucet and formed with a water discharge opening beneath said nozzle, a steam line leading from said tank to said faucet, a valve-controlled water line from said tank communicating with said faucet, and a removable cover for sealing said opening.

9. The combination with a sterilizing tank of a one-piece valved faucet for said tank having a steam flow chamber underlying and communicating with the nozzle of said faucet and formed with a water discharge opening beneath said nozzle, a steam line leading from said tank to said faucet, a valve-controlled water line from said tank communicating with said faucet through a portion of said steam line, a removable cover for sealing said opening, and a steam waste line communicating with said chamber.

10. The combination with a sterilizing tank, a gauge glass, and upper and lower hollow fittings supporting said gauge glass and communicating with said tank, of a faucet housing communicating with said lower fitting and having a water discharge opening beneath the faucet nozzle, and means for subjecting the entire internal surface of said housing and nozzle to a flow of steam from said tank through said gauge glass and fittings during the sterilizing operation, said means including an openable cover for said water discharge opening and a steam and water waste line leading from said faucet housing said cover being closed when said waste line is functioning.

11. The combination with a sterilizing tank, a gauge glass, and upper and lower hollow fittings supporting said gauge glass and communicating with said tank, of a valve controlling the communication of said lower fitting with said tank, a faucet housing communicating with said lower fitting and having a water discharge opening beneath the faucet nozzle, an openable cover for said water discharge opening, and means for bathing the internal surfaces of said housing and nozzle with steam flowing from said tank through said gauge glass and fittings during the sterilizing operation.

12. The combination with a sterilizing tank, a gauge glass, and upper and lower hollow fittings supporting said gauge glass and communicating with said tank, of a valve controlling the communication of said lower fitting with said tank, a faucet housing communicating with said lower fitting and having a water discharge opening beneath the faucet nozzle, a valve controlling communication of said faucet housing with said lower fitting, an openable cover for said water discharge opening, and a steam and water waste line leading from said faucet housing said last-named valve being open and said cover closed when said waste line is functioning.

13. The combination with a sterilizing tank, and a draw-off faucet for said tank, of means for subjecting the entire internal surface of said faucet to steam from said tank during the sterilizing operation and permitting sterilized water to be drawn off after the sterilizing operation, said means including an enclosure for the faucet nozzle formed with an opening beneath said nozzle, a removable cover for sealing said opening, and means for conducting steam from said tank to and through said faucet and enclosure.

14. The combination with a sterilizing tank, of a steam flow line from said tank, a steam trap in said flow line, and a draw-off faucet interposed in said flow line between said tank and said trap and forming a part of said flow line.

15. The combination with a sterilizing tank, of a steam flow line from said tank, a steam trap in said flow line, and a gauge glass and a draw-off faucet both interposed in said flow line between said tank and said trap and forming parts of said flow line.

FLOYD A. BLASHFIELD.